United States Patent [19]

Knauf et al.

[11] Patent Number: 5,428,119
[45] Date of Patent: Jun. 27, 1995

[54] PROCESS FOR POLYBUTADIENE PRODUCTION USING CATALYST WITH HIGH ACTIVITY

[75] Inventors: Thomas F. Knauf; Akhtar Osman, both of Sarnia, Canada

[73] Assignee: Polysar Rubber Corporation, Sarnia, Canada

[21] Appl. No.: 150,659

[22] Filed: Nov. 9, 1993

[51] Int. Cl.[6] .................. C08F 4/12; C08F 136/06
[52] U.S. Cl. .................................. 526/153; 526/148; 526/151; 526/164; 526/340.4
[58] Field of Search ............ 526/148, 151, 164, 340.4, 526/153

[56] References Cited

U.S. PATENT DOCUMENTS

| | | | |
|---|---|---|---|
| 3,794,604 | 2/1974 | Throckmorton et al. | 526/153 X |
| 4,260,707 | 4/1981 | Sylvester et al. | 526/114 |
| 4,444,903 | 4/1984 | Carbonaro et al. | 502/102 |
| 4,461,883 | 7/1984 | Takeuchi et al. | 526/139 |
| 4,533,711 | 8/1985 | Takeuchi et al. | 526/340.4 |
| 5,220,045 | 6/1993 | Knauf et al. | 556/55 |

FOREIGN PATENT DOCUMENTS

| | | | |
|---|---|---|---|
| 0131609 | 7/1984 | Japan | 526/153 |
| 0196307 | 11/1984 | Japan | 526/153 |

OTHER PUBLICATIONS

Hackh's Chem. Dictionary (4th ed.) McGraw-Hill Inc., N.Y., 711, 1969.

Primary Examiner—Fred Teskin
Attorney, Agent, or Firm—Joseph C. Gil; Godfried R. Akorli

[57] ABSTRACT

A process for producing high cis-1,4-polybutadienes using a catalyst system based on a rare earth compound that exhibits improved catalytic activity is provided which process comprises polymerizing 1,3-butadiene in a polymerization medium comprising a hydrocarbon solvent at a temperature of from about 0° C. to about 120° C. in the presence of a catalyst system which is a mixture of (1) a rare earth carboxylate selected from the group of neodymium carboxylates wherein the carboxylate has from 4 to 12 carbon atoms, (2) an alkyl aluminum chloride selected from the group of compounds represented by the formulae $R^2AlCl_2$, $R^2{}_3Al_2Cl_3$ and $R^2{}_2AlCl$ wherein $R^2$ is a hydrocarbon residue having from 8 to 12 carbon atoms and (3) an organo aluminum compound of the formula $R^3{}_2AlH$ wherein $R^3$ is an alkyl group having from 2 to 6 carbon atoms, the ratio of the mols of the rare earth carboxylate to the mols of (2) plus (3) is in the range from about 1:1.5 to about 1:100, to the desired conversion.

18 Claims, No Drawings

PROCESS FOR POLYBUTADIENE PRODUCTION USING CATALYST WITH HIGH ACTIVITY

FIELD OF THE INVENTION

The present invention relates to a process for the polymerization of conjugated diolefins and more particularly to a polymerization process whereby a polybutadiene having a high cis-1,4-content is produced in the presence of a catalyst system based on a rare earth metal carboxylate that exhibits high activity.

BACKGROUND OF THE INVENTION

The use of rare earth compounds as components of organo-metallic mixed catalyst systems for the stereospecific polymerization of 1,3-butadiene to afford a polybutadiene with a high cis-1,4-structure has been known for a long time. For example, U.S. Pat. No. 4,260,707 discloses a catalyst that may be used for polymerizing diene monomers in solution comprises (a) a reaction mixture formed by reacting a rare earth carboxylate and an aluminum compound wherein there are three hydrocarbon residues having from 1 to 20 carbon atoms attached to the aluminum, (b) a trialkyl aluminum and/or a dialkyl aluminum hydride and (c) a Lewis acid.

An improved process for preparing conjugated diolefin polymers or copolymers having a high content of 1,4-cis-units and high chain linearity is disclosed in U.S. Pat. No. 4,444,903. In this process a catalytic system prepared from (a) at least one carboxylate or alcoholate of a rare earth element, (b) a tertiary organic halide and (c) an organo metallic aluminum compound not containing halide ions of the formula: $R^aR^bAlR^c$ in which $R^a$ and $R^b$ are alkyl residues and $R^c$ is hydrogen or an alkyl radical.

Another example of the use of an organometallic mixed catalyst system containing a rare earth compound for producing a conjugated diene polymer is disclosed in U.S. Pat. No. 4,461,883. The process is characterized by polymerizing at least one conjugated diene with a catalyst consisting of (A) a reaction product of a Lewis base and a carboxylate of a rare earth element of the lanthanum series represented by $AlR^2R^3R^4$ wherein $R^2, R^3$, and $R^4$ which may be identical or different represent hydrogen or alkyl substituents, although $R^2, R^3$, and $R^4$ may not all be hydrogen at the same time and (C) an alkyl aluminum halide represented by $AlX_nR^5{}_{3-n}$ wherein X is a halide, $R^5$ is an alkyl group and n has the value of 1, 1.5, 2 or 3 and (D) optionally a conjugated diene.

U.S. Pat. No. 4,533,711 discloses that a polybutadiene rubber composition comprising a polybutadiene having a cis-1,4-content of at least 70 percent, an average chain length of 110 to 450 cis-1,4-units, a molecular weight distribution of at least 5.0 and containing at least 1 per cent by weight of a component having a molecular weight of not less than 25,000,000 is produced by polymerizing 1,3-butadiene in the presence of a catalyst system containing the compounds I to III as essential ingredients; (I) a compound of a lanthanum series rare earth element; (II) a trialkyl aluminum compound; and (III) a halogenated aluminum compound represented by a general formula of $AlX_nR_{3-n}$ wherein X is a halogen atom, R is a hydrocarbon residue and n is 1 to 3; until the degree of conversion of 1,3-butadiene reaches at least 3 percent and then adding at least one compound selected from organo aluminum hydrides represented by a general formula of $AlH_mR_{3-m}$ wherein R is a hydrocarbon residue and m is 1 or 2 and aromatic hydrocarbons containing active hydrogen as a modifier.

However, the foregoing catalyst systems are not without their disadvantages in that some of the catalyst systems are very difficult to dissolve in the hydrocarbon solvents which are commonly employed as the reaction solvent for polymerization of 1,3-butadiene. Moreover, the catalytic activity of some of the catalyst systems is not particularly high which is a disadvantage in industrial use.

SUMMARY OF THE INVENTION

It is an object of this invention to provide a process for the preparation of a high molecular polybutadiene having more than 96 percent of the butadiene units present in the cis-1,4-structure using a catalyst system based on a rare earth compound that exhibits improved catalytic activity.

Thus, in accordance with the present invention there is provided a process for producing a high molecular weight rubbery polybutadiene having more than 96 percent of the butadiene units present in the cis-1,4-structure which process comprises the steps of: (A) polymerizing 1,3-butadiene in a polymerization medium comprising a hydrocarbon solvent at a temperature of from about 0° C. to about 120° C. in the presence of a catalyst system dissolved in said polymerization medium, said catalyst system being a mixture of (1) a rare earth carboxylate represented by the formula $Nd(R^1CO_2)_3$ wherein Nd represents the rare earth element neodymium and $R^1CO_2$ represents a residue of a carboxylic acid having from 4 to 12 carbon atoms, (2) an alkyl aluminum chloride compound selected from the group consisting of compounds represented by the formulae $R^2AlCl_2$, $R^2{}_3Al_2Cl_3$ and $R^2{}_2AlCl$ wherein $R^2$ is a hydrocarbon residue having from 8 to 12 carbon atoms and (3) an organo aluminum compound of the formula $R^3{}_2AlH$ wherein $R^3$ is an alkyl group having from 2 to 6 carbon atoms, the ratio of the mols of said rare earth carboxylate to the mols of said alkyl aluminum chloride compound plus said organo aluminum compound being in the range of from about 1:1.5 to about 1:100, (B) continuing the polymerization thus initiated to the monomer conversion desired and (C) thereafter deactivating the polymerization and recovering the polybutadiene.

DETAILED DESCRIPTION OF THE INVENTION

Now, in accordance with the present invention it has been found that a hydrocarbon soluble catalyst system prepared by combining three essential compounds namely (1) a rare earth carboxylate, (2) an alkyl aluminum chloride compound wherein the alkyl group has from 8 to 12 carbon atoms and (3) an organo aluminum compound, is highly active in the polymerization of 1,3-butadiene affording a polybutadiene having more than 96 percent of the butadiene units present in the cis-1,4-structure.

The rare earth carboxylates useful in the production of catalysts of this invention are represented by the formula $Nd(R^1CO_2)_3$ in which Nd represents the rare earth element neodymium and $R^1$ represents a hydrocarbon group having from 4 to 11 carbon atoms. The group represented by $R^1CO_2$ is a residue of a carboxylic acid of which suitable non-limiting examples for use in the formation of the rare earth carboxylates are pentanoic acid, 2,2-dimethyl propanoic acid (pivalic acid), hexanoic acid, cyclohexanoic acid, heptanoic acid, octanoic acid, 2-ethylhexanoic acid, 2,2-dimethyl hexanoic acid, nonanoic acid, decanoic acid and versatic acid which is variously described as being tert-decanoic acid or a mixture of branched carboxylic acids wherein $R^1$ has the value of 8 to 10. Preferably the group represented by $R^1CO_2$ in the formula $Nd(R^1CO_2)_3$ for the rare earth carboxylate is a residue of a carboxylic acid selected from the group consisting of 2,2-dimethyl propanoic acid (pivalic acid), 2-ethylhexanoic acid and versatic acid and most preferably the group represented by $R^1CO_2$ is a residue of versatic acid.

The alkyl aluminum chloride compound that is suitable for use in the catalyst system is selected from the group consisting of compounds represented by the formulae $R^2AlCl_2$, $R^2_3Al_2Cl_3$ and $R^2_2AlCl$ wherein $R^2$ is a hydrocarbon residue having from 8 to 12 carbon atoms. Groups which may be represented by $R^2$ are exemplified by the straight and branched chain aliphatic hydrocarbon groups such as octyl, 2-ethylhexyl, nonyl, decyl, undecyl, dodecyl and the like. Illustrative nonlimiting examples of suitable alkyl aluminum chloride compounds include dioctyl aluminum chloride, octyl aluminum sesquichloride, octyl aluminum dichloride, didecyl aluminum chloride, decyl aluminum sesquichloride, decyl aluminum dichloride, didodecyl aluminum chloride, dodecyl aluminum sesquichloride, dodecyl aluminum dichloride and the like. The preferred alkyl aluminum chloride compound for use in the catalyst system is selected from the group consisting of dioctyl aluminum chloride, octyl aluminum sesquichloride, octyl aluminum dichloride, didodecyl aluminum chloride, dodecyl aluminum sesquichloride and dodecyl aluminum dichloride; dioctyl aluminum chloride, octyl aluminum sesquichloride and octyl aluminum dichloride being preferred more, and octyl aluminum sesquichloride being the alkyl aluminum chloride compound of choice.

In the practice of the process of the present invention it has been found, that although when there is a mixture of both a sterically larger group such as an octyl group and a sterically smaller group such as an ethyl group in the alkyl aluminum chloride compound, the activity of the catalyst system is somewhat improved relative to the activity of the catalyst system wherein there is only a sterically small group such as the ethyl group present in the alkyl aluminum chloride compound, the activity is not improved as much as when there are only sterically larger groups present in the organo aluminum chloride compound.

The third component that is appropriate for use in the catalyst system is an organo aluminum compound represented by the formula $R^3_2AlH$ wherein $R^3$ is an alkyl group having from 2 to 6 carbon atoms. Illustrative nonlimiting examples of such compounds include diethyl aluminum hydride, dipropyl aluminum hydride, diisopropyl aluminum hydride, dibutyl aluminum hydride, diisobutyl aluminum hydride, dipentyl aluminum hydride, dihexyl aluminum hydride and the like. The preferred organo aluminum compound for use in the catalyst system is selected from the group consisting of diethyl aluminum hydride, diisopropyl aluminum hydride and diisobutyl aluminum hydride, diisobutyl aluminum hydride being the compound that is the most preferred.

The ratio of the mols of the rare earth carboxylate to the mols of the alkyl aluminum chloride compound plus said organo aluminum compound is in the range of from about 1:1.5 to about 1:100, preferably from about 1:1.5 to about 1:60.

The ratio of the mols of the rare earth carboxylate to the mols of the alkyl aluminum chloride compound is preferably in the range of from about 1:0.5 to about 1:10, more preferably in the range of from about 1:1 to about 1:5.

The ratio of the mols of rare earth carboxylate to the mols of organo aluminum compound is preferably in the range of from about 1:1 to about 1:50, more preferably in the range of from about 1:2 to about 1:20.

The process of the present invention is carried out in a polymerization medium containing an inert hydrocarbon which is a solvent at least for the monomer, 1,3-butadiene and the catalyst system. Suitable inert hydrocarbons for use as the polymerization medium include aliphatic, cycloaliphatic, aromatic and monoolefinic hydrocarbons and mixtures thereof. More specifically suitable hydrocarbons are those selected from the group consisting of $C_4$ to $C_8$ aliphatic hydrocarbons, $C_5$ to $C_{10}$ cyclic aliphatic hydrocarbons, $C_6$ to $C_9$ aromatic hydrocarbons, $C_4$ to $C_8$ monoolefinic hydrocarbons and mixtures thereof. Illustrative nonlimiting examples of the aforementioned hydrocarbons include butane, pentane, hexane, heptane, cyclopentane, cyclohexane, benzene, toluene, xylene, butene-1 and pentene-1. Preferably the process of the present invention is carried out in a polymerization medium that does not contain an aromatic hydrocarbon, that is the process is carried out in hydrocarbons selected from the group consisting of $C_4$ to $C_8$ aliphatic hydrocarbons, $C_5$ to $C_{10}$ cyclic aliphatic hydrocarbons and $C_4$ to $C_6$ monoolefinic hydrocarbons and mixtures thereof as the catalyst system exhibits the improved activity in such a polymerization medium. More preferably the inert hydrocarbon for use as the polymerization medium is selected from hexane and cyclohexane.

The proportion or concentration of 1,3-butadiene in the polymerization medium can vary somewhat depending on the particular solvent or diluent medium employed. In most solvents in which both the 1,3-butadiene and the product-polymer are completely soluble, from about 12 to 35 percent by weight of the 1,3-butadiene, based on the total weight of the solution can be employed with the production of a flowable cement.

To prepare the catalyst system, solutions of components (1), (2) and (3) may be mixed in any desired sequence in a suitable inert solvent with stirring. The same solvent as that used for the polymerization of the 1,3-butadiene may be used for preparation of the catalyst system. The temperature at which preparation of the catalyst system is carried out may vary within a wide range and is generally limited by the melting point and the boiling point of the solvent used. Temperatures ranging from about 0° C. to about 120° C. are suitable. Preparation of the catalyst system may be carried out separately or, preferably, by the addition and mixing of catalyst components (2) and (3) with the polymerization reaction mixture followed by the addition of catalyst component (1). If desired, components (2) and (3) may be mixed together before they are added to the polymerization mixture. It is immaterial whether the 1,3-butadiene which is to be polymerized is added before or after the catalyst components or whether the 1,3-butadiene is added between the addition of one catalyst component and the addition of another catalyst component.

The temperature at which the process of the present invention can be carried out can vary somewhat, temperatures in the range of from about 0° C. to about 120° C., the lower temperature limit being dictated more by the freezing point of the reaction medium rather than by the catalyst activity. Normally the process of the present invention is conducted within a temperature range of from about 40° C. to about 90° C.

In accordance with the process of this invention, a high molecular weight polybutadiene having more than 96 percent of the butadiene units present in the cis-1,4-configuration is produced by polymerizing, in a reaction vessel provided with agitation, 1,3-butadiene dissolved in a polymerization medium comprising an inert hydrocarbon solvent in the presence of a catalyst system comprising (1) a rare earth carboxylate represented by the formula $Nd(R^1CO_2)_3$, (2) an alkyl aluminum chloride compound wherein the alkyl groups attached to the aluminum are sterically large and (3) an organo aluminum compound of the formula $R^3{}_2AlH$ that exhibits improved activity.

The polymerization may be carried out as a batchwise polymerization or as a continuous process polymerization, the procedure of continuous process polymerization being preferred with 1,3-butadiene and the catalyst system being continuously supplied to the reaction vessel.

Without limiting in any way the scope of the invention, the process of the present invention may consist of combining 1,3-butadiene with a mixture of inert hydrocarbons that comprise the polymerization medium. To this combination, there is then added a solution of an alkyl aluminum chloride compound and an organo aluminum compound and an organo aluminum compound. Following thorough agitation and a period of aging (if desired) the solution mixture can be conveniently introduced into one or a series of reaction vessels where the polymerization is to take place. The rare earth carboxylate may be added to the solution containing the 1,3-butadiene or directly where the polymerization is to occur. After the polymerization has reached the desired degree of conversion, the reaction mixture is treated with an agent that deactivates the catalyst, such agents being selected from water, alcohol and the like. Catalyst residues may be removed by water washes, alcohol washes and the like. The polymer may simultaneously be precipitated by the addition of alcohol or alcohol solvent mixtures that both destroy the catalyst and precipitate the polymer as a solid crumb which may be further washed with water or alcohol and subsequently dried by methods well known in the art.

In the examples which illustrate the practice of this invention, the analytical techniques below were employed for the analysis of the high cis-1,4-polybutadienes produced.

The weight percentages of the cis-1,4-, the trans-1,4- and the vinyl-1,2-structures in the polybutadiene products were determined by Fourier Transform InfraRed (FTIR) Spectroscopy using polymeric films cast from solution on to potassium bromide plates. The areas of the absorbance peaks at 995 cm$^{-1}$, 968 cm$^{-1}$, 912 cm$^{-1}$, 895 cm$^{-1}$ and 740 cm$^{-1}$ were integrated and the weight percentages of the cis-1,4, trans-1,4 and vinyl-1,2-structures were then determined from empirically derived relationships.

The Mooney viscosity of the product was determined according to ASTM method D-1646 and the dilute solution viscosity was obtained according to a modified version of ASTM method D-3616 wherein the amount of sample used in the preparation of the polymeric solution was 0.3000±0.0002 grams and the flow times of the polymeric solution and the solvent were determined at a temperature of 30°±0.02° C.

1,3-Butadiene obtained from Union Carbide and Phillips pure grade hexane were purified by passage through a column packed with 4 Å molecular sieves, followed by passage through a column packed with 13× molecular sieves. A 20 weight percent solution of diisobutyl aluminum hydride in hexane obtained from the Aldrich Chemical Company and the trialkyl aluminums obtained from Ethyl Corporation were used as received. An 18.6 weight percent solution of neodymium versatate in hexane was prepared according to the procedure in U.S. Pat. No. 5,220,045 (Knauf et al to Bayer).

The following examples are intended to illustrate specific embodiments of the invention and are not intended to limit the scope of the invention.

EXAMPLE 1

This example illustrates the rate of polymerization of 1,3-butadiene using the catalyst system of the process of the present invention.

A 10 weight percent solution of octyl aluminum sesquichloride ($Oct_3Al_2Cl_3$) in hexane was prepared by mixing octyl aluminum dichloride (6.33 g, 0.03 mol), a 25 weight percent solution of trioctyl aluminum in heptane (14.67 g, 0.01 mol) and hexane (79 g) together under an atmosphere of argon.

Three 1 liter glass bottles each capped with a 2 hole crown cap sealed with a fluorinated rubber gasket were each charged with hexane (425.0 g), 1,3-butadiene (75.0 g, 1.39 mol) (15 percent by weight of 1,3-butadiene based on the total weight of the 1,3-butadiene and the solvent), diisobutyl aluminum hydride (1.75 ml, 1.97 millimol) and the solution of the octyl aluminum sesquichloride (0.39 g, 0.0788 millimol) and the bottles containing the solutions placed in a water bath at a temperature of 60° C. and shaken for 15 minutes in order to equilibrate the contents. To each solution there was then added a solution of the neodymium versatate (0.35 ml, 0.0825 millimol) and polymerization of the 1,3-butadiene initiated. After 15 minutes the reaction mixtures in one of the bottles was treated with a mixture of methanol and water in order to deactivate the catalyst and coagulate the polybutadiene which was then dried in an oven under vacuum at a temperature of 60° C. for 24 hours. The polybutadiene was analyzed for percentage conversion, Mooney viscosity, dilute solution viscosity and microstructure and the results are given in Table I. The reaction mixtures in the remaining two bottles were treated in a similar manner at the end of 30 minutes and 60 minutes respectively and the results are given in Table I.

EXAMPLE 2

A reaction using the same procedure as in Example 1 was carried out with the exception that a 1.0 molar solution of ethyl aluminum sesquichloride ($Et_3Al_2Cl_3$) (0.78 g, 0.0788 millimol) in heptane was used in place of the solution of octyl aluminum sesquichloride.

The results are given in Table I.

EXAMPLE 3

A reaction using the same procedure as in Example 1 was carried out with the exception that a solution of ethyl octyl aluminum sesquichloride having the average composition ($Et_{2.0}Oct_{1.0}Al_{2.0}Cl_{3.0}$) (1.33 g, 0.0788 millimol) in hexanes was used in place of the solution of octyl aluminum sesquichloride.

The ethyl octyl aluminum sesquichloride was prepared by mixing a 1.0 molar solution of ethyl aluminum dichloride (150 ml, 0.15 mol), a 25.3 weight percent solution of trioctyl aluminum in heptane (48.31 g, 0.03 mol) and a 1.0 molar solution of triethyl aluminum in cyclohexane (16.7 ml, 0.016 mol) together under an atmosphere of argon.

The results of the polymerizations are given in Table I.

EXAMPLE 4

A reaction using the same procedure as in Example 1 was carried out with the exception that a solution of ethyl octyl aluminum sesquichloride having the average composition ($Et_{1.5}Oct_{1.5}Al_{2.0}Cl_{3.0}$) (1.43 g, 0.0788 millimol) in heptane/hexane was used in place of the solution of octyl aluminum sesquichloride.

The ethyl aluminum sesquichloride was prepared by mixing together a 1 molar solution of ethyl aluminum dichloride (60 ml, 0.06 mol) with a 25.3 weight percent solution of trioctylaluminum (28.99 g, 0.02 mol) in heptane under an atmosphere of argon.

The results of the polymerizations are given in Table I.

On comparing the results from Examples 1 through 4 in Table I, it can be seen that when there is complete substitution of the ethyl group by the octyl group in the alkyl aluminum sesquichloride, the activity of the catalyst system is increased significantly, the percentage conversion of the 1,3-butadiene to high cis-1,4-polybutadiene after 30 minutes being comparable to the percentage conversion after 60 minutes when a portion or all of the alkyl group in the alkyl aluminum sesquichloride is the sterically small ethyl group.

0.01 mol) and hexane (561 g) together under an atmosphere of argon.

Two 1 liter glass bottles each capped with a 2 hole crown cap sealed with a fluorinated rubber gasket was charged with hexane (425 g), 1,3-butadiene (75.0 g, 1.39 mol) (15 percent by weight of 1,3-butadiene based on the total weight of the 1,3-butadiene and the solvent), diisobutyl aluminum hydride (1.75 ml, 1.97 millimol) and the solution of dioctyl aluminum chloride (6.8 g, 0.24 millimol) and the bottles containing the solutions placed in a water bath at a temperature of 60° C. and shaken for 15 minutes in order to equilibrate the contents. To each solution there was then added a solution of the neodymium versatate (0.35 ml, 0.0825 millimol) and polymerization of the 1,3-butadiene initiated. After 15 minutes the reaction in one of the bottles was treated with a mixture of methanol and water in order to deactivate the catalyst and coagulate the polybutadiene which was then dried in an oven under vacuum at a temperature of 60° C. for 24 hours. The polybutadiene was analyzed for percentage conversion, Mooney viscosity, dilute solution viscosity and the results are given in Table II. The reaction mixture in the remaining bottle was treated in a similar manner at the end of 60 minutes and the results are given in Table II.

EXAMPLE 6

A reaction using the same procedure as in Example 5 was carried out with the exception that a 1 weight percent solution of octyl aluminum sesquichloride was used in place of the solution of dioctyl aluminum chloride.

The 1 weight percent solution of octyl aluminum sesquichloride in hexane/heptane was prepared by mixing octyl aluminum dichloride (6.33 g, 0.03 mol), a 25.3 weight percent solution of trioctyl aluminum in heptane (14.67 g, 0.01 mol) and hexane (979 g) together under an atmosphere of argon.

TABLE I

| | Cocatalyst | | | | | | | | | | | |
|---|---|---|---|---|---|---|---|---|---|---|---|---|
| | Example | | | | | | | | | | | |
| | 1. ($Oct_3 Al_2 Cl_3$) | | | 2. ($Et_3 Al_2 Cl_3$)* | | | 3. ($Et_2 Oct_1 Al_2 Cl_3$) | | | 4. ($Et_{1.5} Oct_{1.5} Al_2 Cl_3$) | | |
| Reaction Time (mins) | 15 | 30 | 60 | 15 | 30 | 60 | 15 | 30 | 60 | 15 | 30 | 60 |
| Solids (% in soln.) | 6.5 | 13.7 | 14.6 | 5.6 | 9.3 | 14.2 | 5.7 | 9.3 | 14.6 | 6.3 | 9.6 | 14.7 |
| Product (wt. in g) | 33.10 | 65.5 | 71.1 | 28.6 | 47.2 | 62.3 | 28.9 | 49.5 | 71.1 | 30.4 | 47.5 | 67.5 |
| Conv.% by solids | 42.7 | 91.3 | 97.3 | 37.3 | 62.0 | 94.7 | 38.0 | 62.0 | 97.3 | 42.0 | 64.0 | 98.0 |
| Mooney (ML 1+4 @ 100° C.) | 21.6 | 39.1 | 56.4 | 27.0 | 46.1 | 41.6 | 27.3 | 47.8 | 40.3 | 26.0 | 42.7 | 40.5 |
| DSV | 2.77 | 2.80 | 3.16 | .19 | 3.42 | 3.30 | 3.21 | 3.40 | 3.34 | 2.56 | 3.30 | 3.31 |
| Micro Structure cis | 98.2 | 98.3 | 98.2 | 98.4 | 98.5 | 98.2 | 98.4 | 98.4 | 98.1 | 98.6 | 98.5 | 98.2 |
| trans | 1.2 | 1.2 | 1.3 | 1.0 | 1.0 | 1.2 | 0.8 | 1.1 | 1.3 | 0.9 | 1.0 | 1.2 |
| vinyl | 0.6 | 0.5 | 0.5 | 0.6 | 0.5 | 0.6 | 0.8 | 0.5 | 0.6 | 0.5 | 0.5 | 0.6 |

*Control reaction

The following examples describe the polymerizations of 1,3-butadiene using a catalyst system comprising neodymium versatate and either dioctyl aluminum chloride, octyl aluminum sesquichloride or octyl aluminum dichloride together with diisobutyl aluminum hydride.

EXAMPLE 5

A 1 weight percent solution of dioctyl aluminum chloride in hexane/heptane was prepared by mixing octyl aluminum dichloride (2.11 g, 0.01 mol), a 25.3 weight percent solution of trioctyl aluminum (14.5 g, The results are given in Table II.

EXAMPLE 7

A reaction using the same procedure as in Example 5 was carried out with the exception that a 1 weight percent solution of octyl aluminum dichloride in hexane was used in place of the solution of dioctyl aluminum.

The results are given in Table II.

EXAMPLE 8

A control reaction using the same procedure as in Example 5 was carried out with the exception that a 0.25 weight percent solution of ethyl aluminum sesquichloride was used in place of the solution of dioctyl aluminum chloride. The results are given in Table II.

From the results in Table II, it can be seen that when an octyl group is substituted for the ethyl group in diethyl aluminum chloride, ethyl aluminum sesquichloride or ethyl aluminum dichloride, the activity of the catalyst system is increased, from about 10 percent to about 35 percent more high cis-1,4-polybutadiene being produced after 15 minutes polymerization than when the alkyl aluminum chloride compound used in the catalyst system is ethyl aluminum sesquichloride.

TABLE II

| | Cocatalyst Example | | | | | | | |
|---|---|---|---|---|---|---|---|---|
| | 5. ($Oct_2$ Al Cl) | | 6. ($Oct_3$ $Al_2$ $Cl_3$) | | 7. ($Oct_1$ Al $Cl_2$) | | 8. $Et_3$ $Al_2$ $Cl_3$)* | |
| Reaction Time (mins) | 15 | 60 | 15 | 60 | 15 | 60 | 15 | 60 |
| Solids (% in soln.) | 4.6 | 14.3 | 5.1 | 14.0 | 5.7 | 13.9 | 4.3 | 13.5 |
| Product (wt. in | 23.1 | 71.2 | 24.6 | 71.4 | 28.4 | 72.0 | 21.1 | 69.9 |
| Mooney (ML 1+4 @ 100° C.) | 21.2 | 50.9 | 20.4 | 41.4 | 24.7 | 55.8 | 20.3 | 51.3 |
| DSV | 2.92 | 3.27 | 3.05 | 2.94 | 3.11 | 3.32 | 3.11 | 3.25 |
| Micro cis | 98.3 | 98.3 | 98.3 | 98.6 | 98.4 | 98.4 | 98.4 | 97.5 |
| Structure trans | 1.2 | 1.1 | 1.3 | 0.9 | 1.1 | 1.1 | 1.1 | 1.1 |
| vinyl | 0.5 | 0.6 | 0.4 | 0.5 | 0.5 | 0.5 | 0.5 | 1.4 |

*Control reaction

What is claimed is:

1. A process for the production of a high molecular weight rubbery polybutadiene having more than 96 percent of the butadiene units present in the cis-1,4 structure which process comprises the steps of: (A) polymerizing 1,3-butadiene in a polymerization medium comprising a hydrocarbon solvent at a temperature of from about 0° C. to about 120° C. in the presence of a catalyst system dissolved in said polymerization medium, said catalyst system being a mixture of (1) a rare earth carboxylate represented by the formula $Nd(R^1CO_2)_3$ wherein Nd represents the rare earth element neodymium and $R^1CO_2$ represents a residue of a carboxylic acid having from 4 to 12 carbon atoms, (2) an alkyl aluminum chloride compound selected from the group consisting of compounds represented by the formulae $R^2AlCl_2$, $R^2_3Al_2Cl_3$ and $R^2_2AlCl$ wherein $R^2$ is a hydrocarbon residue having from 8 to 12 carbon atoms and (3) an organo aluminum compound of the formula $R^3_2AlH$ wherein $R^3$ is an alkyl group having from 2 to 6 carbon atoms, the ratio of the mols of said rare earth carboxylate to the mols of said alkyl aluminum chloride compound plus said organo aluminum compound being in the range of from about 1:1.5 to about 1:100, (B) continuing the polymerization thus initiated to the monomer conversion desired and (C) thereafter deactivating the polymerization and recovering the polybutadiene.

2. The process of claim 1 wherein the group represented by $R^1CO_2$ in the neodymium carboxylate is a residue of a carboxylic acid selected from the group consisting of 2,2-diethyl propanoic acid (pivalic acid), 2-ethyl-hexanoic acid and versatic acid.

3. The process of claim 2 wherein the group represented by $R^1CO_2$ is the residue of versatic acid.

4. The process of claim 1 wherein the alkyl aluminum chloride compound is represented by the formula $R^2_3Al_2Cl_3$ and $R^2$ is a hydrocarbon residue having from 8 to 12 carbon atoms.

5. The process of claim 4 wherein $R^2$ is a hydrocarbon residue having 8 carbon atoms.

6. The process of claim 4 wherein $R^2$ is a hydrocarbon residue having from 9 to 12 carbon atoms.

7. The process of claim 1 wherein the alkyl aluminum chloride compound is represented by the formula $R^2AlCl_2$ and $R^2$ is a hydrocarbon residue having from 8 to 12 carbon atoms.

8. The process of claim 7 wherein $R^2$ is a hydrocarbon residue having 8 carbon atoms.

9. The process of claim 1 wherein the alkyl aluminum chloride compound is represented by the formula $R^2_2AlCl$ and $R^2$ is a hydrocarbon residue having from 8 to 12 carbon atoms.

10. The process of claim 9 wherein $R^2$ is a hydrocarbon residue having 8 carbon atoms.

11. The process of claim 1 wherein the alkyl group $R^3$ in the organo aluminum compound of the formula $R^3_2AlH$ has from 2 to 4 carbon atoms.

12. The process of claim 11 wherein the alkyl group $R^3$ having from 2 to 4 carbon atoms is selected from the group consisting of ethyl, isopropyl and isobutyl.

13. The process of claim 12 wherein the alkyl group $R^3$ is isobutyl.

14. The process of claim 1 wherein the ratio of the mols of the rare earth carboxylate to the mols of alkyl aluminum chloride compound is in the range of from about 1:0.5 to about 1:10.

15. The process of claim 1 wherein the ratio of the mols of rare earth carboxylate to the mols of organo aluminum compound is in the range of from about 1:1 to about 1:50.

16. The process of claim 1 wherein the hydrocarbon solvent is selected from the group consisting of $C_4$ to $C_8$ aliphatic hydrocarbons, $C_5$ to $C_{10}$ cyclic aliphatic hydrocarbons, $C_4$ to $C_8$ monoolefinic hydrocarbons and mixtures thereof.

17. The process of claim 16 wherein said $C_4$ to $C_8$ aliphatic hydrocarbon is selected from the group consisting of hexane and heptane and said $C_5$ to $C_{10}$ aliphatic cyclic hydrocarbon is selected from the group consisting of cyclopentane and cyclohexane.

18. The process of claim 1 which comprises the steps of polymerizing (A) 1,3-butadiene in a polymerization medium comprising a hydrocarbon solvent at a temperature of from about 40° C. to about 90° C. in the presence of a catalyst system dissolved in said hydrocarbon solvent, said catalyst system being (1) a rare earth carboxylate represented by the formula $Nd(R^1CO_2)_3$ wherein the group represented by $R^1CO_2$ is a residue of versatic acid, (2) an alkyl aluminum chloride compound represented by the formula $R^2{}_3Al_2Cl_3$ wherein $R^2$ is a hydrocarbon residue having 8 carbon atoms and (3) an organo aluminum compound of the formula $R^3{}_2AlH$ wherein the alkyl group $R^3$ is isobutyl, the ratio of the mols of said rare earth carboxylate to the mols of said alkyl aluminum chloride compound being the range of from about 1:0.5 to about 1:10 and the ratio of the mols of said rare earth carboxylate to the mols of said organo aluminum compound being in the range of from about 1:1 to about 1:50, (B) continuing the polymerization thus initiated to the monomer conversion desired and (C) thereafter deactivating the polymerization and recovering the polybutadiene.

* * * * *